UNITED STATES PATENT OFFICE 1,956,176

OPAQUE GLASS

Joseph Carl Parkinson, Tarentum, Pa., assignor to Pittsburgh Plate Glass Company, a corporation of Pennsylvania No Drawing. Application October 22, 1930, Serial No. 490,542

1 Claim. (Cl. 106—36.1)

The invention relates to a colored opaque glass for use largely in architectural work. The invention has for its objects the production of a cream colored glass which will not fade or change its color on prolonged exposure to sunlight. Heretofore, glass of this color has been formed by fusing with a white glass batch, a certain amount of uranium oxide and manganese. The color produced is satisfactory, but on prolonged exposure to light, the color changes due to the manganese changing to a higher oxide, and the glass takes on a slight purple tinge detracting substantially from its appearance. The object of the present invention is to overcome this difficulty and give a glass of the desired color which is permanent. Briefly stated, this is accomplished by mixing with a white glass batch proper quantities of coloring ingredients, each of which contributes to give the desired shade. These ingredients are preferably rouge (iron oxide) sodium uranate, and selenium. Various white glass batches may be used, but the one preferably used contains as the ingredient for giving the white color, a compound containing fluorine, such as cryolite. The preferred batch, in its entirety is as follows:

| | |
|---|---|
| Sand | 885 pounds |
| Soda ash | 306 pounds |
| Feldspar | 675 pounds |
| Cryolite | 90 pounds |
| Fluorspar | 50 pounds |
| Niter | 30 pounds |
| Arsenic or antimony | 15 pounds |
| Rouge | 4 to 10 pounds |
| Sodium uranate | 2 to 7 pounds |
| Selenium | 2 to 10 ounces |

If desired, uranium oxide may be used in place of the sodium uranate or metallic uranium may be employed. The proportion of the coloring agents may be varied within limits depending upon the particular shade desired.

What I claim is:

A cream colored opaque glass formed by fusing together a white glass batch which includes a fluorine compound and an aluminum compound and coloring ingredients comprising rouge, sodium uranate and selenium in the following proportions, batch about 2000 pounds, rouge 4 to 10 pounds, sodium uranate 2 to 7 pounds, and selenium 2 to 10 ounces.

J. CARL PARKINSON.